(12) United States Patent  (10) Patent No.: US 8,868,280 B2
Uratani et al.  (45) Date of Patent: Oct. 21, 2014

(54) TEST SYSTEM AND VEHICLE PERFORMANCE TEST SYSTEM

(71) Applicant: HORIBA, Ltd., Kyoto (JP)

(72) Inventors: Katsumi Uratani, Kyoto (JP); Tsutomu Misogi, Kyoto (JP); Hiroshi Nakamura, Kyoto (JP)

(73) Assignee: HORIBA, Ltd., Kyoto (JP)

( * ) Notice: Subject to any disclaimer, the term of this patent is extended or adjusted under 35 U.S.C. 154(b) by 0 days.

(21) Appl. No.: 13/901,216

(22) Filed: May 23, 2013

(65) Prior Publication Data

US 2013/0317688 A1  Nov. 28, 2013

(30) Foreign Application Priority Data

May 23, 2012 (JP) ................................ 2012-118092
May 23, 2012 (JP) ................................ 2012-118097

(51) Int. Cl.
*G01M 17/00* (2006.01)
*G01M 15/10* (2006.01)
*G01M 17/007* (2006.01)

(52) U.S. Cl.
CPC .............. *G01M 17/00* (2013.01); *G01M 15/10* (2013.01); *G01M 17/007* (2013.01)
USPC ........................................................ 701/29.1

(58) Field of Classification Search
CPC ................................ G01M 17/00; G07C 5/08
USPC ........................................................ 701/29.1
See application file for complete search history.

(56) References Cited

U.S. PATENT DOCUMENTS

| 8,112,163 | B2 * | 2/2012 | Attarwala | 700/46 |
| 8,145,444 | B1 * | 3/2012 | Bickford et al. | 702/85 |
| 8,145,966 | B2 * | 3/2012 | Roblett et al. | 714/737 |
| 8,260,736 | B1 * | 9/2012 | Lear et al. | 706/46 |
| 2004/0243636 | A1 * | 12/2004 | Hasiewicz et al. | 707/104.1 |

(Continued)

FOREIGN PATENT DOCUMENTS

| JP | 04-299798 | 10/1992 |
| JP | 05-315427 | 11/1993 |

(Continued)

OTHER PUBLICATIONS

Hiroshi Kawamura, Automotive Development and Progress in HORIBA's Emission Measurement Technologies, Readout, No. 34, Jan. 31, 2009, pp. 44-49.

(Continued)

*Primary Examiner* — Thomas Tarcza
*Assistant Examiner* — Alex C Dunn
(74) *Attorney, Agent, or Firm* — Brooks Kushman P.C.

(57) ABSTRACT

A device management apparatus has a display part that obtains various types of information outputted from testing devices, and erasably, switchably, or movably displays the pieces of information on a display, wherein regardless of the display of the pieces of information, the display part preferentially displays three alarm icons that are respectively for three pieces of alarm information including: sensitivity alarm information indicating a reduction in sensitivity of each of the testing devices; accumulated operating time alarm information that is alarm information on an accumulated operating time of the testing device; and inspection date/time alarm information that is information indicating approaching or passing of an inspection date/time of the testing device, and respectively have forms that are changed depending on contents indicated by the respective pieces of alarm information.

7 Claims, 14 Drawing Sheets

(56) References Cited

U.S. PATENT DOCUMENTS

| | | | | |
|---|---|---|---|---|
| 2007/0173993 | A1* | 7/2007 | Nielsen et al. | 701/35 |
| 2010/0156654 | A1* | 6/2010 | Bullemer et al. | 340/691.6 |
| 2011/0144777 | A1* | 6/2011 | Firkins et al. | 700/80 |
| 2012/0041858 | A1* | 2/2012 | Lewis | 705/34 |
| 2012/0166249 | A1* | 6/2012 | Jackson | 705/7.28 |
| 2012/0271587 | A1* | 10/2012 | Shibuya et al. | 702/127 |
| 2012/0304007 | A1* | 11/2012 | Hanks et al. | 714/26 |
| 2012/0316835 | A1* | 12/2012 | Maeda et al. | 702/183 |
| 2012/0324420 | A1* | 12/2012 | Collinson | 717/105 |
| 2013/0002697 | A1* | 1/2013 | Ashley et al. | 345/589 |
| 2013/0054056 | A1* | 2/2013 | King et al. | 701/14 |
| 2013/0069792 | A1* | 3/2013 | Blevins et al. | 340/815.4 |
| 2013/0282336 | A1* | 10/2013 | Maeda et al. | 702/184 |

FOREIGN PATENT DOCUMENTS

| | | |
|---|---|---|
| JP | 07-121231 | 5/1995 |
| JP | 08-159967 | 6/1996 |
| JP | 2001-166905 | 6/2001 |
| JP | 2001-191204 | 7/2001 |
| JP | 2002-071528 | 3/2002 |
| JP | 2003-211799 | 7/2003 |
| JP | 2005049353 | 2/2005 |
| JP | 2008-224439 | 9/2008 |
| JP | 2009-074887 | 4/2009 |
| JP | 2010276473 | 12/2010 |
| JP | 2012-093326 | 5/2012 |

OTHER PUBLICATIONS

Horiba Automotive Test Systems, MEXA-7000 Version 3, May 2006, pp. 1-8, http://www.horiba.com/jp/automotive-test-systems/products/emissionmeasurement-systems/dilution-sampling-systems/details/mexa-7000-version-3-930/.

* cited by examiner

TEST SYSTEM AND VEHICLE PERFORMANCE TEST SYSTEM

CROSS-REFERENCE TO RELATED APPLICATIONS

This application claims priority to JP Application No. 2012-118092, filed on May 23, 2012, and JP Application No. 2012-118097, filed on May 23, 2012, the disclosures of which are incorporated in their entirety by reference herein.

TECHNICAL FIELD

The present invention relates to a test system for testing a moving body such as a vehicle, ship, or airplane, or a device used in the moving body. Also, the present invention relates to a vehicle performance test system for testing performance of a vehicle such as an automobile.

BACKGROUND ART

Conventionally, as a vehicle test system, for example, there is known a test system that is adapted to connect a plurality of measuring devices to one measurement management apparatus, and make the measurement management apparatus collectively manage the measuring devices. Also, a system disclosed in JPA 2005-49353 is one that is adapted to provide an automatic test management apparatus above the measurement management apparatus, and make the automatic test management apparatus determine a test schedule.

Meanwhile, each of the measuring devices should be regularly inspected, calibrated, and maintained because the use thereof causes a reduction in performance to make it impossible to ensure reliability of measuring accuracy. Times of such an inspection and the like may be provided for in test regulations. Such pieces of maintenance management information on each of the measuring devices are displayed on a display of the measurement management apparatus, for example, through a window in another window displaying measurement data.

Also, a conventional vehicle performance test system for testing performance of a vehicle such as an automobile is adapted to: make an automatic driving robot run an automobile mounted on a chassis dynamometer according to a predetermined running mode; collect exhaust gas discharged at the time with a fixed capacity sampling device; supply the collected sample gas to an exhaust gas measuring apparatus mounted with a plurality of gas analyzers respectively having different measuring principles to measure respective components; and thereby test performance of the automobile.

Meanwhile, in this sort of vehicle performance test system, tests provided for in the law are performed, and therefore temperature, flow velocity of exhaust gas, and the like during the tests should be accurately adjusted. However, this sort of vehicle performance test system has an extremely complicated flow path system, and therefore once trouble occurs, it is difficult to quickly locate a point causing the trouble to restore it.

SUMMARY

Technical Problem

However, in the case where the number of measuring devices connected to the same measurement management apparatus is large, the maintenance management information cannot be wholly displayed on a screen of the measurement management apparatus in some cases. For example, in the case where the windows are displayed with overlapping each other, the maintenance management information is covered. In this case, a possibility of overlooking the maintenance management information becomes large. For this reason, it may become difficult to maintain and manage the measuring devices as scheduled, and reliability of measurement accuracy may be reduced.

Such a problem is common to testing devices including the measuring devices.

The present invention is made in consideration of such a problem, and a main object thereof is to provide a test system that is adapted to be able to simply and preferentially display, in particular, pieces of highly urgent maintenance management information on all of testing devices connected to a device management apparatus, and perform a secure maintenance check.

Also, the present invention is made in order to provide a vehicle performance test system that can quickly locate a point causing trouble.

Solution to Problem

That is, a test system according to the present invention is provided with: one or more testing devices used for a test; and a device management apparatus that is communicably connected to the testing devices to manage the testing devices, wherein the device management apparatus has a display part that obtains various types of information outputted from the testing devices, and erasably, switchably, or movably displays the pieces of information on a display, wherein regardless of the display of the pieces of information, the display part preferentially displays three alarm icons that are respectively for three pieces of alarm information including: sensitivity alarm information indicating a reduction in sensitivity of each of the testing devices; accumulated operating time alarm information that is alarm information on an accumulated operating time of the testing device; and inspection date/time alarm information that is information indicating approaching or passing of inspection date/time of the testing device, and respectively have forms that are changed depending on contents indicated by the respective pieces of alarm information.

If so, in any of the cases where the various types of information outputted from the testing devices are displayed, not displayed, and moved on the display, the display part displays the three alarm icons. Accordingly, even in the case where information from any of the testing devices is not displayed, or other display content overlap the information to make recognition difficult, or in another case, only by checking the alarm icons, it can be checked whether or not each of the testing devices is in an alarm state.

In the present invention, "changing a form" refers to changing a shape, size, color, pattern or design, font, lighting state (lightness, blinking), and/or the like of each of the alarm icons displayed in the display part alone or in combination, and includes a visual change of the alarm icon.

In order to be able to quickly check pieces of alarm information generated in the whole of the system, the present invention is preferably configured such that a single alarm icon display area that displays the three alarm icons as a set is provided on the display, and when any of the testing devices is brought into an alarm state, a form of a corresponding one of the alarm icons is changed.

In order to immediately finish work corresponding to an generated alarm, the present invention is preferably configured such that when any of the alarm icons is selected and operated, a switch to a list display screen that provides a list display of alarms as a list with demarcating the alarms for each occurrence location and for each content is made; and further, when one column on the list display screen is designated and operated, a predetermined unit schematic diagram including a generation location of an alarm is displayed, and in the schematic diagram, the alarm generation location is displayed with the location being specified.

In the above configuration, the testing devices include a measuring device that measures a state quantity of the object. Specifically, as the measuring device, one that is provided in an exhaust path of an internal combustion engine and measures exhaust gas flowing through the exhaust path can be cited.

Also, a vehicle performance test system according to the present invention is provided with: a measuring device that analyzes exhaust gas to measure performance of a vehicle; and a management apparatus that manages the measuring device, wherein the management apparatus is provided with: a situation data obtaining part that, as situation data, successively obtain information on an operating situation of an analyzer; a trouble data recording part that in a case where content of the obtained situation data meets a predetermined condition, records the situation data in a memory as trouble data; a trouble list display part that displays, among contents indicated by pieces of trouble data recorded in the trouble data recording part, at least contents related to a predetermined item on a screen in a form of a table that is demarcated so as to be able to select each of pieces of trouble data; and a locational information screen display part that displays a locational information screen that illustrates a location where selected trouble data is obtained.

If so, troubles having occurred are displayed as a list by the trouble list display part, and therefore the whole picture of a trouble occurrence situation can be overlooked, and also a location where trouble selected in the locational information screen display part occurs is illustrated, so that the location where the trouble occurs can be visually easily recognized. For this reason, a location where trouble occurs can be quickly grasped to immediately resolve the trouble.

The present invention may be further provided with a monitoring screen display part that, on the screen, displays an alarm icon that lights when the trouble data recording part records trouble data.

Advantageous Effects of Invention

According to the test system of the present invention configured as described, the display part is adapted to, regardless of the display of the pieces of information, preferentially display the alarm icons respectively having forms that are changed depending on contents indicated by the pieces of alarm information, and therefore the occurrence of an alarm in each of the testing devices can be checked at any time without performing any operation.

Also, according to the vehicle performance test system of the present invention configured as described, an occurrence location of trouble can be quickly grasped to immediately resolve the trouble.

DESCRIPTION OF EMBODIMENTS

Figure 1:
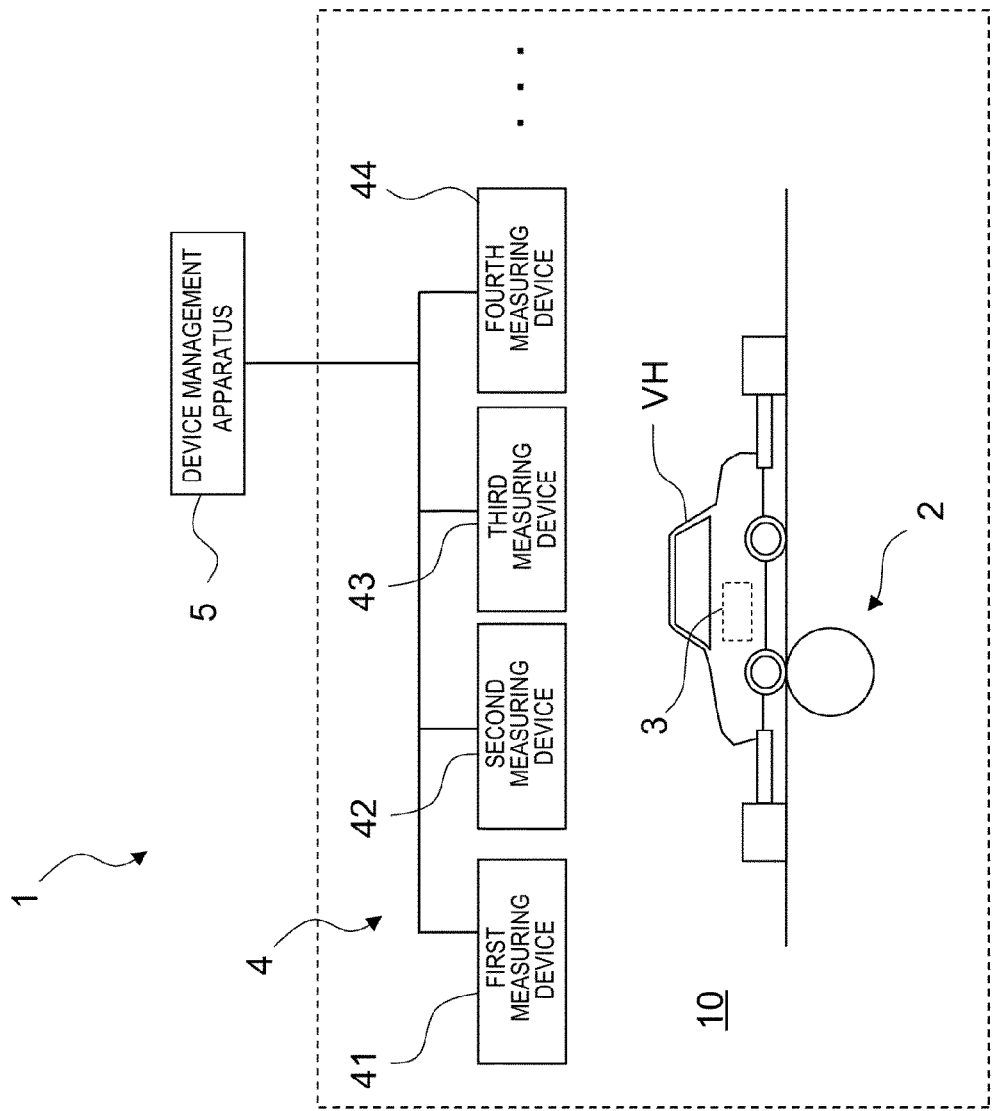
FIG. 1 is a schematic configuration diagram of a vehicle performance test system according to a first embodiment of the present invention.

In the following, a first embodiment of the present invention is described referring to the drawings.

FIG. 1 is a diagram schematically illustrating the whole of a vehicle performance test system according to the first embodiment. The vehicle performance test system 1 is, as illustrated in the diagram, one that is provided with a chassis dynamometer 2, an automatic driving apparatus 3, a plurality of testing devices (exhaust gas measuring devices) 4, a device management apparatus 5, and the like, and can bring a vehicle into a pseudo-running state on the chassis dynamometer 2 to test performance on a fuel consumption, exhaust gas components, and the like of the vehicle. In addition, the test system 1 can also be applied to tests of an engine single body.

The respective parts are described.

The chassis dynamometer 2 is configured to, by cooperating with the automatic driving apparatus 3, enable a vehicle VH to make a pseudo-run in a state similar to that at the time of an actual run.

The automatic driving apparatus 3 is adapted to be able to operate an accelerator, brake, clutch, and the like with being mounted in a driver's cab of the vehicle VH, and automatically run the vehicle VH in one or more running modes such as a 10 mode and an LA mode.

The exhaust gas measuring devices 4 (hereinafter simply referred to as measuring devices 4 as well) refer to devices used to measure exhaust gas, and include, in addition to a device that is configured to integrate one or more gas analyzing units as unit devices and measures the exhaust gas components, a device that performs preprocessing for measuring the exhaust gas components, like a fixed capacity sampling device, as well.

In the first embodiment, a plurality of types of devices is used as the measuring devices. For example, a first measuring device 41 that incorporates a plurality of gas analyzing units respectively having different measuring principles, a second measuring device 42 that is a fixed capacity sampling device, a third measuring device 43 that is an EGR rate measuring device, a fourth measuring device 44 that is an ultrasonic flowmeter, and the like are used. The gas analyzing units include, for example, FID for measuring THC, CLD for measuring $NO_x$, NDIR for measuring CO and $CO_2$, and the like.

The measuring devices 4 are ones that measure amounts of the respective components associated with sampled gas, such as HC, $NO_x$, CO, and $CO_2$, and from corresponding measured values, calculate performance values such as the fuel consumption and an EGR rate of devices constituting the vehicle, such as an internal combustion engine and a catalyst.

Each of the measuring devices 4 incorporates a local computer, and is provided with: a device main body part 4a that controls operating modes (such as a measurement mode, calibration mode, and purge mode) and state modes (such as a sleep mode and a stand-by mode) of the measuring device 4; and a communication part 4b that receives a command signal from the device management apparatus 5 as well as transmitting operating situation information to the device management apparatus 5. The local computer is further provided with an information accumulation part 4c that accumulates: sensitivity information that is information on sensitivity of a sensor part; accumulated operating time information that indicates accumulated operating times of respective parts; inspection date/time specifying information that is information for specifying a preset inspection date/time of the measuring device 4; and the like.

Figure 2:
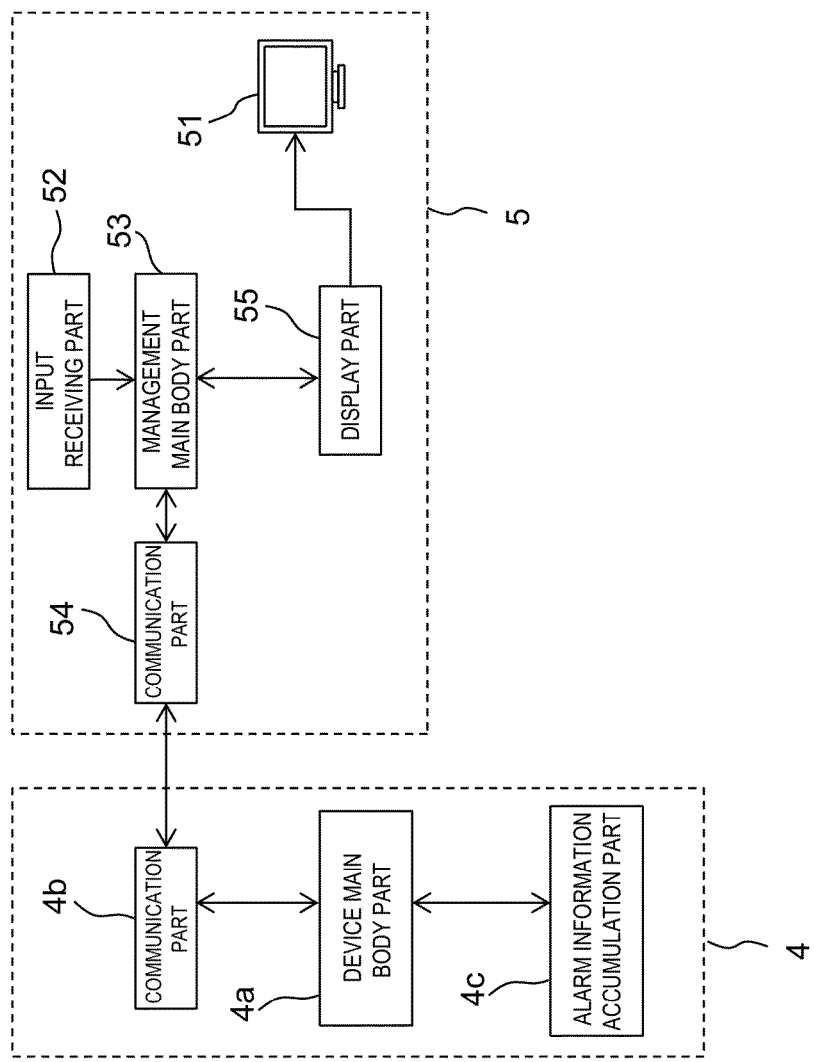
FIG. 2 is a functional block diagram of a measuring device and a device management apparatus in the first embodiment.

The device management apparatus 5 is, for example, one that is configured by installing a predetermined program in a general-purpose computer, and physically provided with a CPU, memory, display 51, input receiving part 52 including a keyboard and a mouse, communication interface, and the like. Also, the device management apparatus 5 is, as illustrated in FIG. 2, configured to fulfill functions as a management main body part 53, communication part 54, input receiving part 52, display part 55, and the like. Further, the device management apparatus 5 is provided with a communication port, and the measuring devices 4 are mutually communicably connected to the device management apparatus 5 by wire or wireless means.

Further, the management main body part 53 of the device management apparatus 5 has functions that respectively generate: sensitivity alarm information on the basis of sensitivity information that is accumulated in the alarm information accumulation part of each of the measuring devices 41 to 44 and then outputted; accumulated operating time alarm information on the basis of accumulated operating time information outputted from each of the measuring devices 41 to 44; and inspection date/time alarm information on the basis of inspection date/time specifying information that is outputted from each of the measuring devices 41 to 44.

The sensitivity alarm information is set with an upper limit and a lower limit as criterions for determining sensitivity information, and generated on the basis of a relationship with upper and lower limits of obtained sensitivity information. Specifically, in the case where the obtained sensitivity information is equal to or more than the upper limit, the sensitivity alarm information is not generated; in the case where the obtained sensitivity information is less than the upper limit and equal to or more than the lower limit, alerting information indicating being in an alert state is generated; and in the case where the obtained sensitivity information is less than the lower limit, alarming information is generated. The alerting information is one that, before informing an alarm, informs that sensitivity is being reduced. In the present embodiment, the alerting information and the alarming information are included in the sensitivity alarm information.

The accumulated operating time alarm information is generated in the case where as a result of comparing obtained accumulated operating time information with endurance time information on a component of each of the measuring devices 41 to 44, particularly endurance time information on a consumable part, a difference between the both is equal to or less than a predetermined value.

The inspection date/time alarm information is generated in the case where as a result of comparing obtained inspection date/time specifying information with a current date/time, a data/time in the inspection date/time specifying information is close to the current date/time, or passes the current date/time. Being close includes the case where the inspection date/time is before the current date/time, and the case where the inspection date/time coincides with the current date/time.

Further, the management main body part 53 creates an after-mentioned alarm list L on the basis of generated sensitivity alarm information, accumulated operating time alarm information, and inspection date/time alarm information. The alarm list L is created for each of the measuring devices 41 to 44 on the basis of the sensitivity alarm information, accumulated operating time alarm information, and inspection date/time alarm information.

Next, operation centering on the device management apparatus 5 is described.

First, an operator performs various types of work (such as piping) associated with the measuring devices 4, and then physically connects the measuring devices 4 to the device management apparatus 7.

Figure 3:
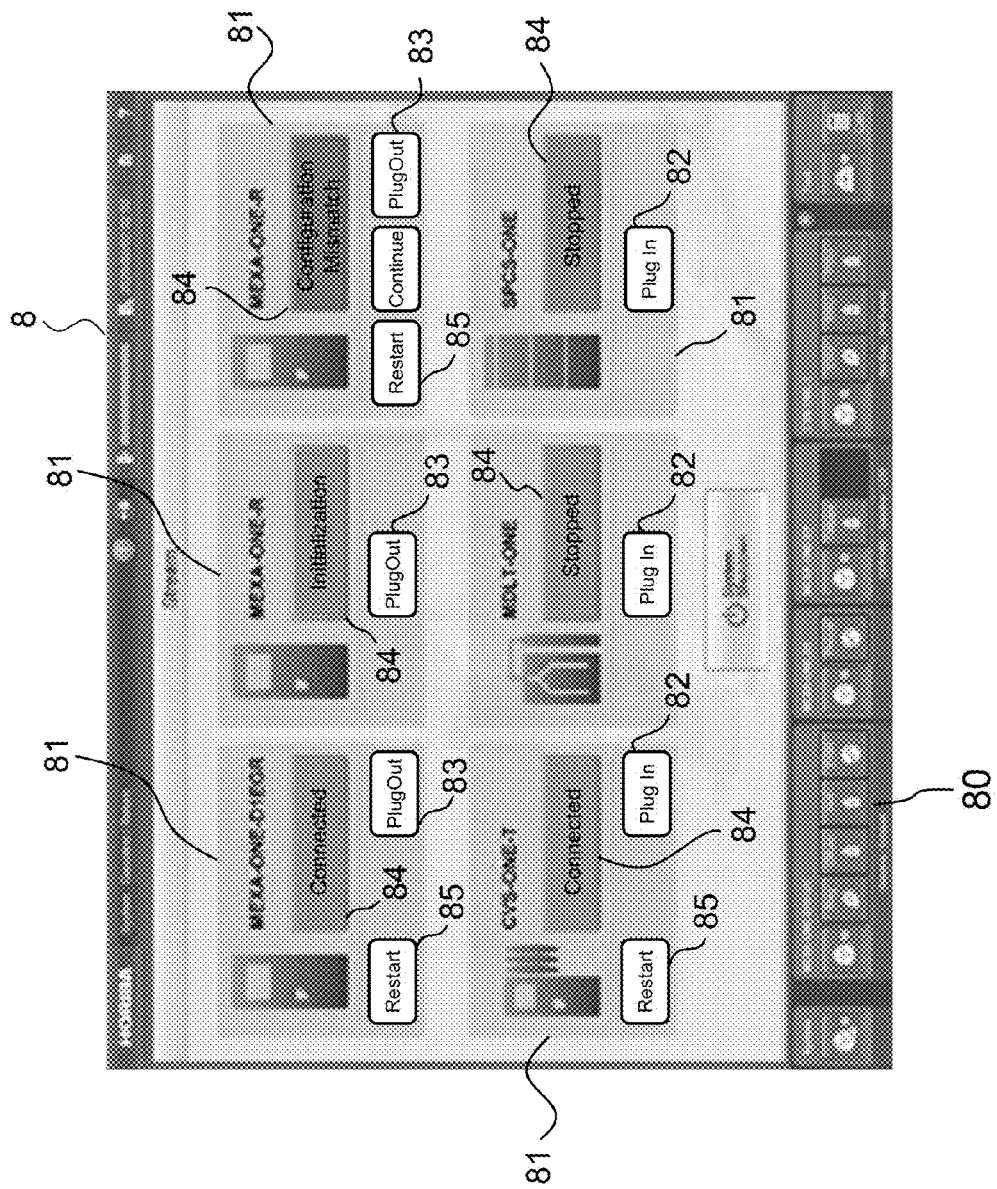
FIG. 3 is a screen configuration diagram illustrating a plug-in screen in the first embodiment.
Figure 4:
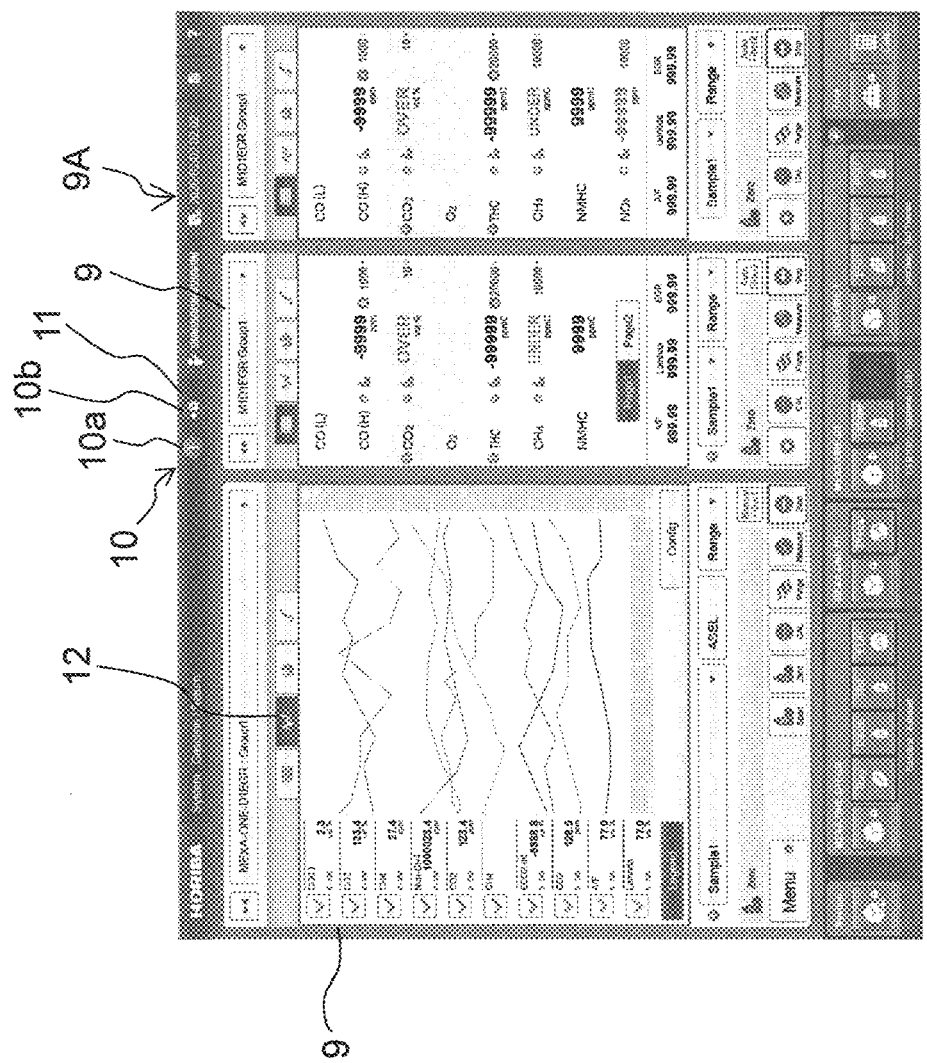
FIG. 4 is a screen configuration diagram illustrating detailed information screen in the first embodiment.
Figure 5:
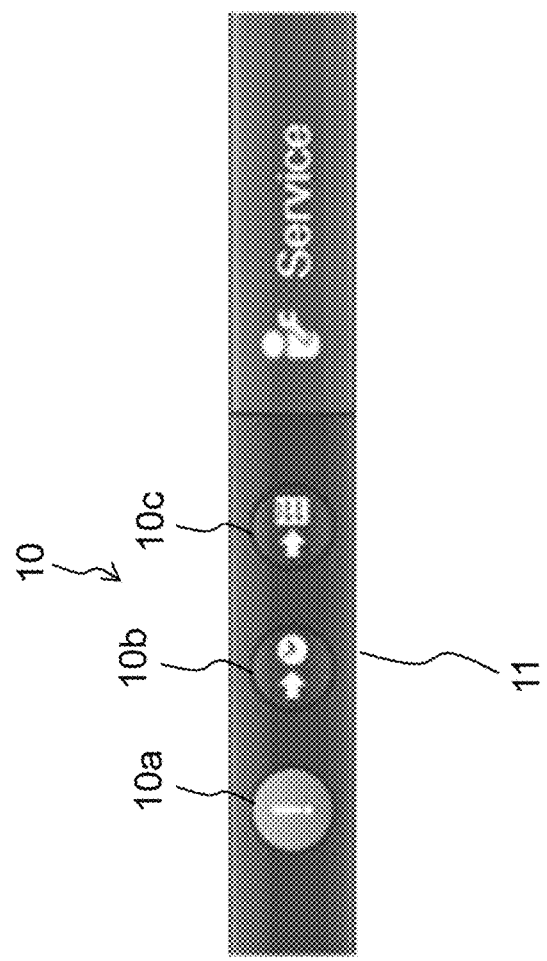
FIG. 5 is a screen configuration diagram illustrating an alarm icon area in the first embodiment with enlarging the area.
Figure 6:
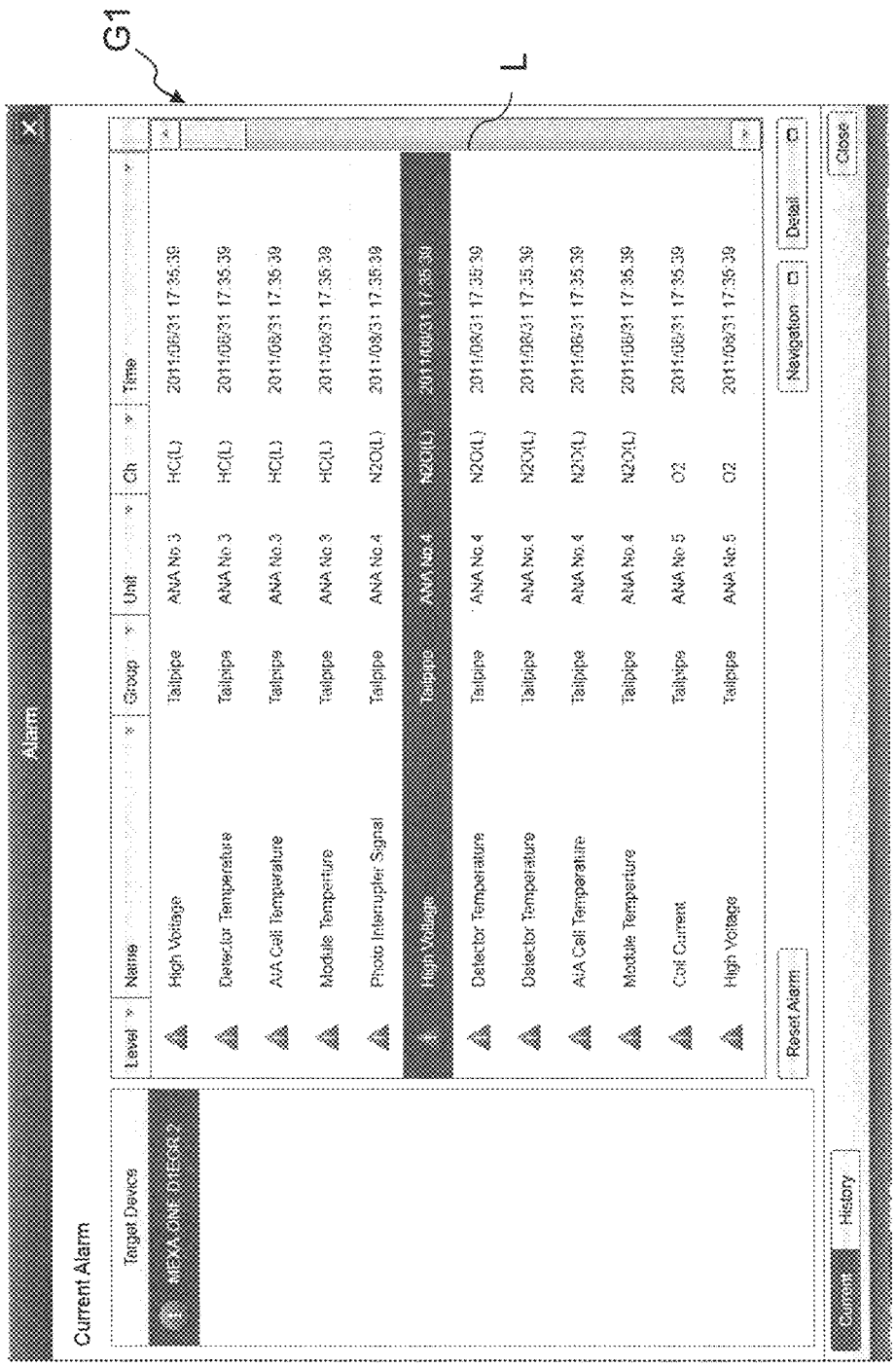
FIG. 6 is a screen configuration diagram illustrating an alarm list display window in the first embodiment.
Figure 7:
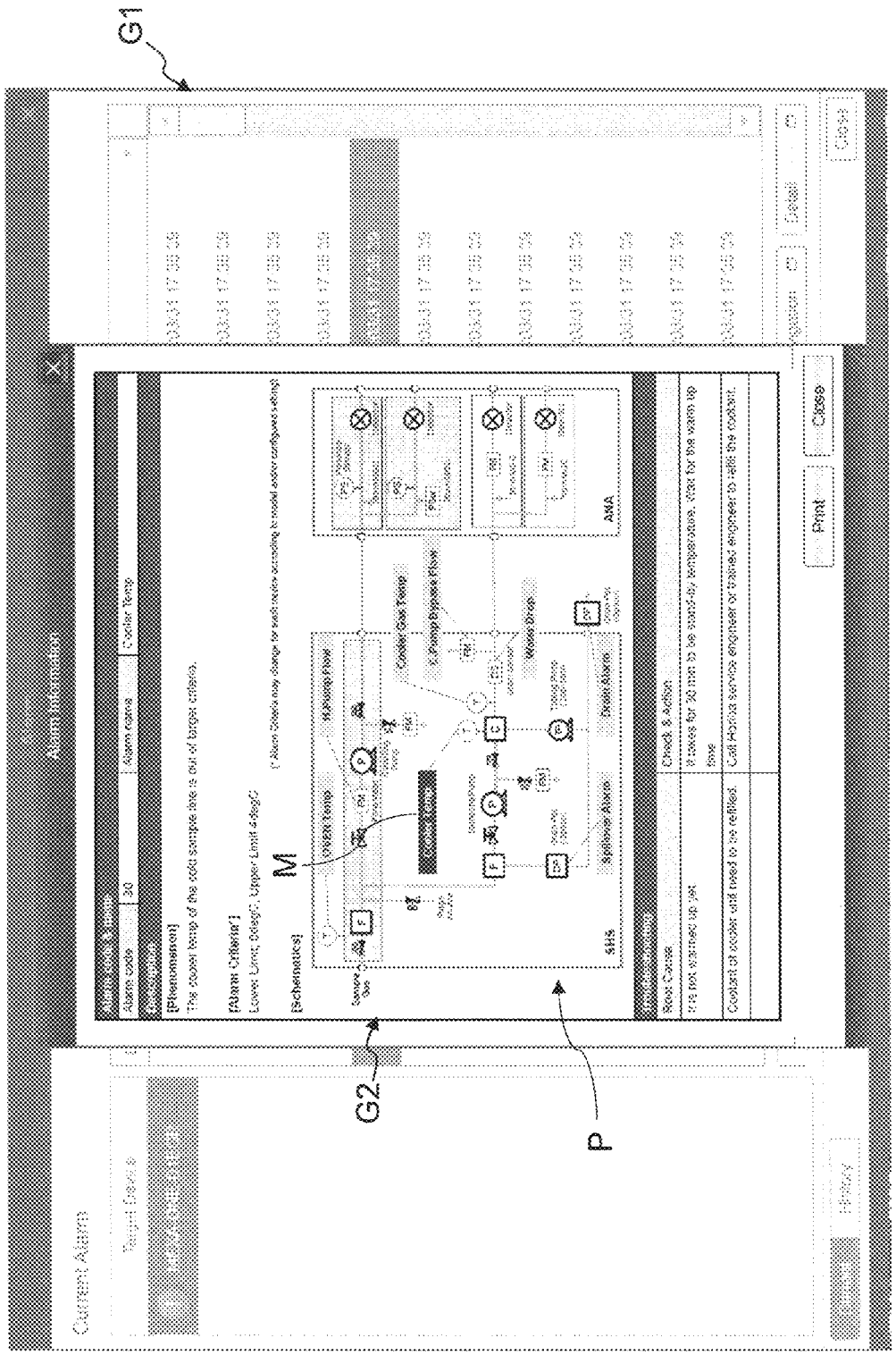
FIG. 7 is a screen configuration diagram illustrating a locational information window in the first embodiment.

On the display 51 of the device management apparatus 5, as an initial screen, a screen (hereinafter also referred to as a plug-in screen) as illustrated in FIG. 3 is displayed by a function of the display part 55. On the plug-in screen 8, a plurality of device marks 81 indicating the preliminarily registered measuring devices 4 are arranged without overlapping one another, and also below the device marks 81, an operating situation icon area 80 is arranged. Each of the device marks 81 is provided with: a connecting button 82 for connecting to a corresponding one of the measuring devices 4; a disconnecting button 83 for disconnecting the measuring device 4; and a connecting state display area 84 indicating a connecting state.

When the connecting button 82 is clicked, a character string "Connected" indicating a state of being communicably connected is displayed in the connecting state display area 84 of the device mark 81. In addition, until mutual communication is established, in the connecting state display area 84, a character string "Initialization" indicating a state of being in preparation for the connection is displayed. Similarly, when the disconnecting button 83 is clicked, a character string "Stopped" indicating a state where the connection is cancelled is displayed in the connecting state display area 84.

In addition, if the connecting button 82 is clicked in a state where a connector cable is unplugged, or the connector cable is unplugged during the connecting state, a character string "Configuration Mismatch" indicating a state of failing in connection is displayed in the connecting state display area 84.

Also, in the connecting state, a reconnecting button (restart button) 85 is newly displayed, and when the reconnecting button 85 is clicked, the communication part 54 restarts a connecting protocol to make reconnection.

In addition, the present invention may be configured to, when each of the measuring devices 4 is physically connected to the device management apparatus 5, make them mutually communicable.

In the case of, in the above manner, communicably connecting the necessary measuring devices 4 to the device management apparatus 5, and performing a predetermined operation, the display part 55 displays a detailed information display screen 9A displaying various types of detailed information on the display 51. The detailed information display screen 9A is one that displays pieces of measurement data by the measuring devices 4, and various types of information in the operating modes (such as the measurement mode, calibration mode, and purge mode) and the state modes (such as the sleep mode and the stand-by mode).

On the detailed information display screen 9A, a device panel window 9 that displays pieces of calibration data, pieces of measurement data, and the like as graphs, numerical values, and the like correspondingly to the various types of information outputted from the respective measuring devices 41 to 44 is displayed by the display part 55. The device panel window 9 can display the pieces of detailed information including measurement results inputted from the respective measuring devices 41 to 44 in the form of graphs, numerical values, or the like by clicking a display form switching button 12.

Thus, when the respective measuring devices 41 to 44 are activated, the management main body part 53 of the device management apparatus 5 generates respective pieces of alarm information from sensitivity information, accumulated operating time information and inspection date/time specifying information accumulated in an alarm information accumulation part 4c of each of the measuring devices 41 to 44, and reflects the pieces of alarm information in alarm icons 10. If the obtained sensitivity information, accumulated operating time information, or inspection date/time specifying information meets a criterion for determining corresponding alarm generation, the management main body part 53 generates corresponding alarm information, and the display part 55 changes a form of a corresponding one of the alarm icons 10 correspondingly to content indicated by the alarm information.

The alarm icons 10 are ones that are displayed in a single alarm icon display area 11, and configured to include: a sensitivity alarm icon 10a corresponding to sensitivity alarm information; an accumulated operating time alarm icon 10b corresponding to accumulated operating time alarm information; and an inspection date/time alarm icon 10c corresponding to inspection date/time alarm information. The alarm icon display area 11 is displayed in an upper part of a screen of the display, specifically displayed in the uppermost part of each of screens including the plug-in screen 8. Accordingly, the alarm icon display area 11 is one that is preferentially displayed regardless of display of an object such as a window that is displayed in each of screens and displays measurement data or the like. Also, the sensitivity alarm icon 10a, accumulated operating time alarm icon 10b, and inspection date/time alarm icon 10c are ones that are set for all of the measuring devices 41 to 44 one by one.

For example, in the case where sensitivity information indicating a reduction in sensitivity of some sensor is inputted from the first measuring device 41 to the management main body part 53 through the communication part 54, the management main body part 53 compares the sensitivity information with preset upper and lower limits, and in the case where the sensitivity information is less than the upper limit, outputs the alerting information or the alarming information. On the basis of this, the display part 55 changes a form of the sensitivity alarm icon 10a, for example, a color of the sensitivity alarm icon 10a, to display the generation of the sensitivity alarm. The sensitivity alarm information includes the alerting information and the alarming information, and therefore the sensitivity alarm icon 10a displays a sensitivity state in a different color for each of the piece of information.

Similarly, accumulated operating time information is inputted; on the basis of a result of comparison with the endurance time information, the accumulated operating time alarm information is outputted; and the display part 55 changes a form of the accumulated operating time alarm icon 10b.

Further, in the case where as a result of inputting inspection date/time specifying information, an inspection date/time based on the inspection date/time specifying information is close to a current date/time, or passes the current date/time, the inspection date/time alarm information is outputted, and the display part 55 changes a form of the inspection date/time alarm icon 10c.

In the case where any of the alarm icons 10 displays an alarm in the above manner, by selecting and operating, for example, clicking the icon, an alarm list display window G1 that provides a list display as a list is displayed corresponding to content of the displayed alarm. The alarm list display window G1 displays the alarm list L in which alarms are demarcated for each generation location and for each content.

By operating, for example, double-clicking one column, which is highlighted by being designated, in a state where the alarm list L is displayed, a schematic diagram P of the predetermined gas analyzing units and the like including a generation location of an alarm is displayed on a locational information window G2. In the schematic diagram P, the alarm generation location M is displayed with being specified by being made different in a display form from other locations, for example, made different in color. Further, below the schematic diagram P, information on a way to handle the alarm is displayed.

As described, in an upper part of the display 51, regardless of display of a screen, the sensitivity alarm icon 10a, accumulated operating time alarm icon 10b, and inspection date/time alarm icon 10c are displayed in the alarm icon display area 11, and when an alarm is generated, a form of a corresponding one of the icons is changed, so that an alarm generated during measuring the exhaust gas can be constantly surely grasped.

In this case, an alarm for sensitivity or accumulated operating time can be grasped, and therefore a sensor having reduced sensitivity, a consumable part of which replacement time is approaching, such as a motor, or the like can be efficiently maintained. Also, on the basis of an inspection date/time alarm, a regular inspection and adjustment of each of the analyzing units, which are required by exhaust gas regulations, can be surely performed by a due date. Accordingly, the measuring devices 4 can be respectively kept in states of being able to make expected measurements.

In addition, by operating an alarm icon 10 having a changed form, an alarm list is displayed, and further by designating one of columns listed in the alarm list and clicking the column, the schematic diagram P indicating an alarm generation location M is displayed, so that the location where an alarm is generated can be easily visually recognized. For this reason, the content and location of the alarm generation can be quickly grasped to immediately resolve trouble causing the alarm.

Also, only a generation location of a selected alarm is indicated by a mark M in the locational information window G2, and therefore even in the case where in the locational information window G2, another trouble occurrence location is present, an occurrence location of selected trouble can be easily specified.

Note that the present invention is not limited to the above-described first embodiment.

The display 51 may be one that is configured to be of a touch panel type. In this case, in place of the click operation in the above-described first embodiment, by placing a finger, an input pen, or the like on an operation button such as a connecting button 82 or a disconnecting button 83 to touch a screen, the same operation as the clicking can be performed.

In the above-described first embodiment, described is the measurement on an internal combustion engine mounted in the vehicle; however, the present invention may be one that, with another device of the vehicle, such as an automatic transmission, being set as an object, performs a performance test of the object.

Also, as an object to be tested, a ship, an airplane, or the like that is mounted with an internal combustion engine similarly to a vehicle, or a single body of the internal combustion engine mounted in any of them is also possible.

As the diagram that schematically illustrates an alarm generation location in the locational information window in the above-described first embodiment, a structure diagram that schematically presents a mechanical configuration of a unit including one or more analyzers may be used.

Also, the above-describe first embodiment is configured to indicate only a generation location of a selected alarm with the mark in the locational information window; however, the present invention may be adapted to, in the case where a plurality of alarm generation locations is present in the same locational information window, indicate all of them with marks, respectively.

Further, the above-described first embodiment is adapted to display the alarm list display window and the locational information window as separately opened windows, respectively; however, the present invention may be adapted to divide one window into two screens, and collectively display an alarm list and locational information in the one window.

The testing devices include, without limitation to the exhaust gas measuring device, a device used to test a moving body such as a ship or an airplane, or to test a component of the moving body, for example, an automatic driving apparatus such as a dynamometer or a robot. The device management apparatus includes, besides an apparatus directly managing testing devices, an apparatus indirectly managing them, such as the automatic test management apparatus in the above-described first embodiment.

In the following, a vehicle performance test system according to a second embodiment is described referring to the drawings.

Figure 8:
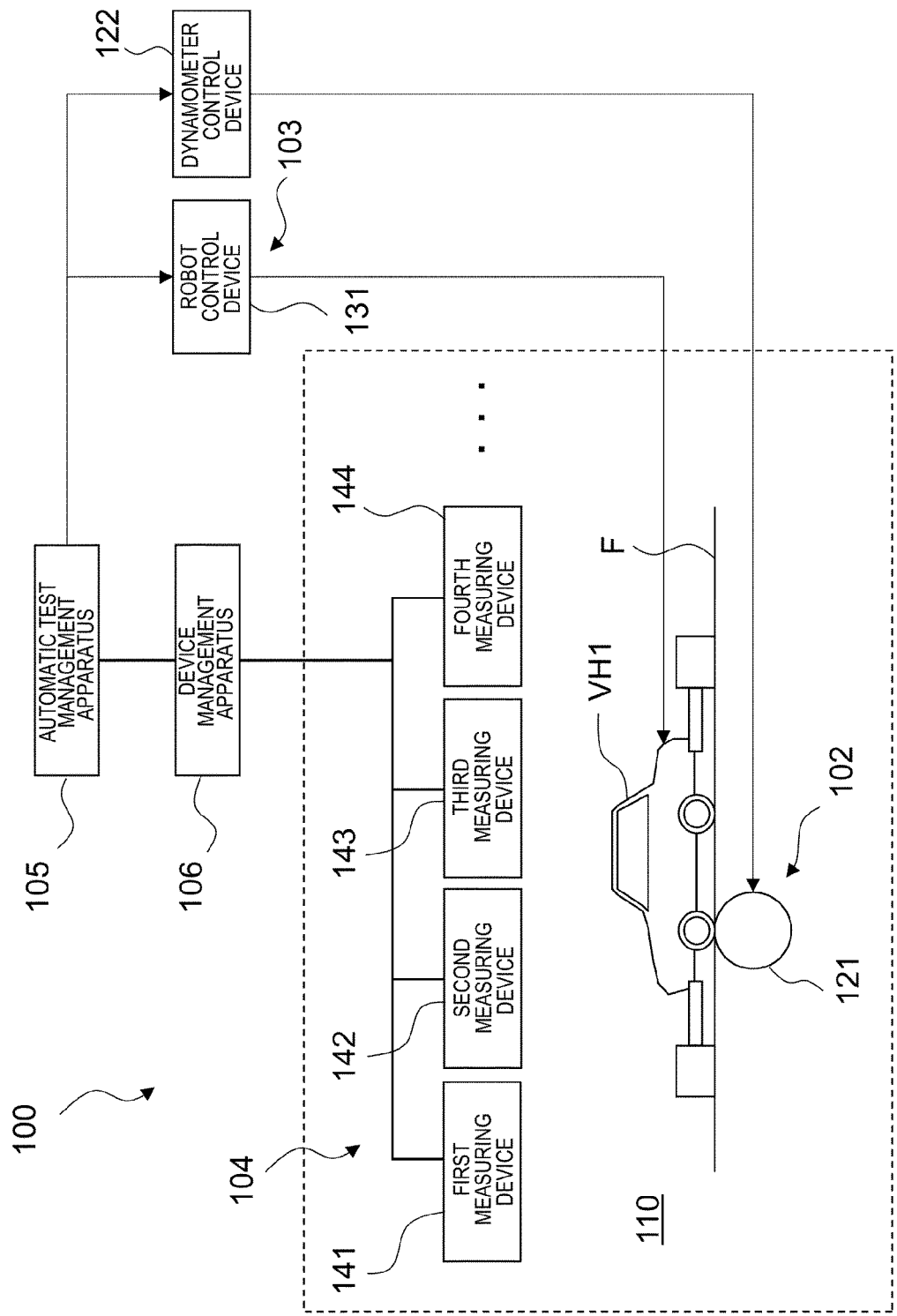
FIG. 8 is a schematic overall diagram illustrating a vehicle performance test system according to a second embodiment of the present invention.

FIG. 8 is a diagram schematically illustrating the whole of the vehicle performance test system 100 according to the second embodiment. The vehicle performance test system 100 is, as illustrated in the diagram, one that is provided with a chassis dynamometer 102, an automatic driving apparatus 103, an automatic test management apparatus 105, a plurality of exhaust gas measuring devices 104, a device management apparatus 106, and the like, and can bring a vehicle VH1 into a pseudo-running state on the chassis dynamometer 102 to test performance on a fuel consumption, exhaust gas components, and the like of the vehicle VH1.

In the following, the respective parts are described. The chassis dynamometer 102 is one that is provided with: a single shaft rotating drum 121; a motor or a flywheel (not illustrated) that applies a load to the rotating drum 121; and a dynamometer control device 122 that controls them. The rotating drum 121 and the motor or flywheel are placed in a pit that is located under a floor F of a test room 110, and a top part of the rotating drum 121 is exposed from an opening provided in the floor F of the test room 110. The chassis dynamometer 102 is configured such that by setting the vehicle VH1 such that driving wheels of the vehicle VH1 are in a test location located directly on the top part of the rotating drum 121, the vehicle VH1 can run in a state similar to that at the time of an actual run. The dynamometer control device 122 is contained in, for example, a measurement room that is provided adjacent to the test room 110. In addition, the test room 110 and the measurement room (or in addition to them, the pit) are collectively referred to as a so-called cell.

The automatic driving apparatus 103 is one that is provided with: a driving robot (not illustrated) that is mounted in a driver's cab of the vehicle VH1 and drives an accelerator, brake, clutch, and the like; and a robot control device 131 that is connected to the driving robot to control the driving robot, and adapted to be able to, by providing various command signals to the robot control device 131, control the driving robot to automatically run the vehicle VH1 in one or more running modes such as a 110 mode and an LA mode. The robot control device 131 is contained in, for example, the measurement room.

The automatic test management apparatus 105 is one that is, although detailed description thereof is omitted, basically intended to set a running test schedule. Setting the running test schedule includes, for example, in addition to setting a running mode and a test date, and other settings, more minutely setting vehicle behavior such as a vehicle speed and an engine rotational speed, and setting a measurement object, measurement timing, and the like. The automatic test management apparatus 105 is provided with a communication port, and mutually communicably connected with the measuring devices 104, chassis dynamometer 102, automatic driving apparatus 103, and the like by wire or wireless means.

Thus, when such schedule settings are made by an operator, the automatic test management apparatus 105 appropriately transmits command signals to the chassis dynamometer 102, automatic driving apparatus 103, device management apparatus 106, and the like according to a set schedule to control them such that a test is performed according to the schedule.

Note that in FIG. 8, the one automatic test management apparatus 105 is connected with the one device management apparatus 106; however, the one automatic test management apparatus 105 may be connected with a plurality of device management apparatuses 106. The automatic test management apparatus 105 can perform scheduling independently for each of the device management apparatuses 106.

The exhaust gas measuring devices 104 (hereinafter simply referred to as measuring devices 104 as well) refer to devices used to measure exhaust gas, and include, for example, in addition to a device that is configured to integrate one or more gas analyzers as unit devices and measures exhaust gas components, a device that performs preprocessing for measuring the exhaust gas components, like a fixed capacity sampling device, as well.

In the second embodiment, a plurality of types of devices is used as the measuring devices 104. For example, a first measuring device 141 that incorporates a plurality of gas analyzers respectively having different measuring principles, a second measuring device 142 that is a fixed capacity sampling device, a third measuring device 143 that is an EGR rate measuring device, a fourth measuring device 144 that is an ultrasonic flowmeter, and the like are used. The gas analyzers include, for example, FID for measuring THC, CLD for measuring $NO_x$, NDIR for measuring CO and $CO_2$, and the like.

The respective measuring devices 104 are ones that are provided with sampling tubes for sampling intake gas or exhaust gas from intake and exhaust paths of a vehicle internal combustion engine, and measure amounts of the respective components associated with gas sampled through the sampling tubes, such as HC, $NO_x$, CO, and $CO_2$, and from corresponding measured values, calculate performance values such as a fuel consumption and an EGR rate of devices constituting the vehicle, such as the internal combustion engine and a catalyst.

For this purpose, the respective measuring devices 104 incorporate local computers in addition to sensors for measurement, and the local computers correct and calibrate output values from the sensors to calculate the measured values indicating the respective component amounts as well as fulfilling functions as: calculation parts that calculate the device performance values from the measured values; and communication parts that transmit the measured values, device performance values, and the like calculated by the calculation parts to the device management apparatus 106 according to predetermined protocols.

Also, each of the local computers is further provided with: a mode control part that, upon receiving a command signal from the device management apparatus 106, controls operating modes (such as a measurement mode, calibration mode, and purge mode) and state modes (such as a sleep mode and a stand-by mode) of a corresponding one of the exhaust gas measuring devices 104; a calibration part that calibrates sensors; and a local accumulation part that accumulates pieces of device state information of the measuring device 104 over a range from the past to the present, such as pump pressure information indicating suction pressure by a built-in pump, sensitivity information that is information on sensitivity of a sensor part, accumulated operating time information that indicates accumulated operating times of respective parts, and inspection data/time specifying information that is information for specifying a preset inspection date/time of the measuring device 104.

Further, each of the measuring devices 104 incorporates various types of sensors for monitoring an operating situation thereof, such as a pressure sensor and a temperature sensor, and in the second embodiment, the sensors function as a situation data obtaining part 401 that obtains pieces of situation data on the operating situation of the measuring device 104, such as pressure data and temperature data.

Figure 9:
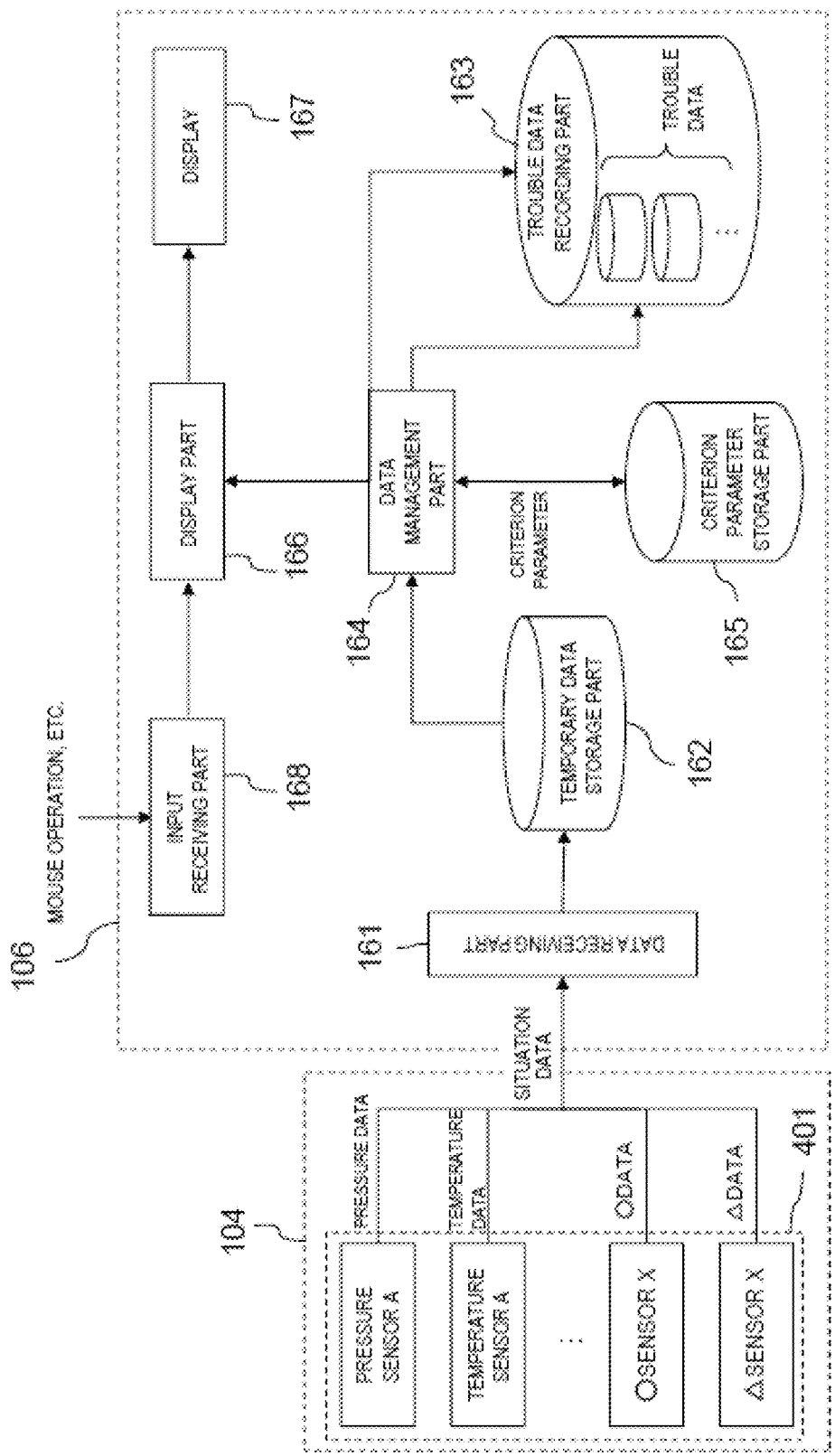
FIG. 9 is a functional block diagram of a device management apparatus and an exhaust gas measuring device in the second embodiment.

The device management apparatus 106 is, for example, one that is configured by installing a predetermined program in a general-purpose computer, and physically provided with a CPU, memory, display 167, input means (such as a keyboard and a mouse), communication interface, and the like. Also, the CPU and its peripheral devices cooperate according a program stored in the memory, and thereby the device management apparatus 106 is configured to fulfill functions as a disengagement/engagement operation monitoring part, device mark display part, device information obtaining part, and the like, as well as, in the second embodiment, as illustrated in FIG. 9, fulfilling functions as a data receiving part 161, temporary data storage part 162, trouble data recording part 163, data management part 164, criterion parameter storage part 165, display part 166, input receiving part 168, and the like. Further, the device management apparatus 106 is provided with a communication port, and the measuring devices 104 are mutually communicably connected to the device management apparatus 106 by wire or wireless means.

In the following, the respective parts of the device management apparatus 106 are described in detail.

The data receiving part 161 is one that continuously obtains the pieces of situation data outputted from the various types of sensors such as the pressure and temperature sensors, which function as the situation data obtaining part 401, at regular time intervals in chronological order, and continuously writes the pieces of obtained situation data in the temporary data storage part 162 that is set in a predetermined area of the memory. Note that when capacity of the temporary data storage part 162 is full, pieces of data are sequentially erased from oldest data, and pieces of new situation data are written in spaces for the pieces of erased data.

The data management part 164 is one that determines whether or not contents of the pieces of situation data stored in the temporary data storage part 162 respectively meet corresponding predetermined conditions, and only in the case where any of the contents meets a corresponding one of the predetermined conditions, as trouble data, transfers a corresponding one of the pieces of situation data from the temporary data storage part 162 to the trouble data recording part 163 provided in a predetermined area of the memory.

To determine whether or not the predetermined conditions are met, criterion parameters provided corresponding to the respective pieces of situation data are used. The criterion parameters are preliminarily stored in the criterion parameter storage part 165 that is provided in a predetermined area of the memory. For example, in the case of, at the time of exceeding a predetermined pressure value, desiring to store corresponding situation data as the trouble data, the criterion parameters include the predetermined pressure value.

Figure 10:
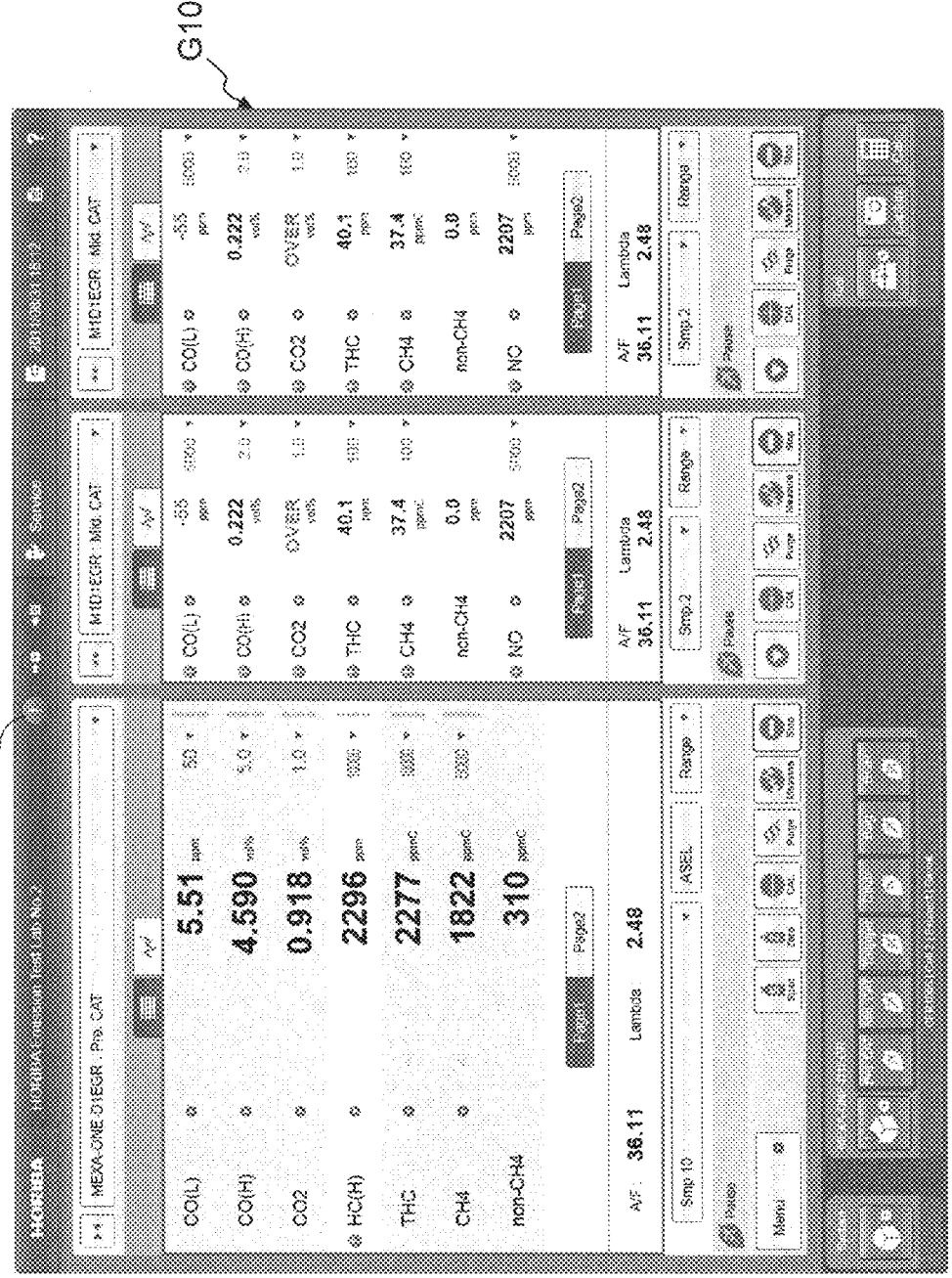
FIG. 10 is a screen explanatory diagram illustrating a monitoring screen in the second embodiment.
Figure 11:
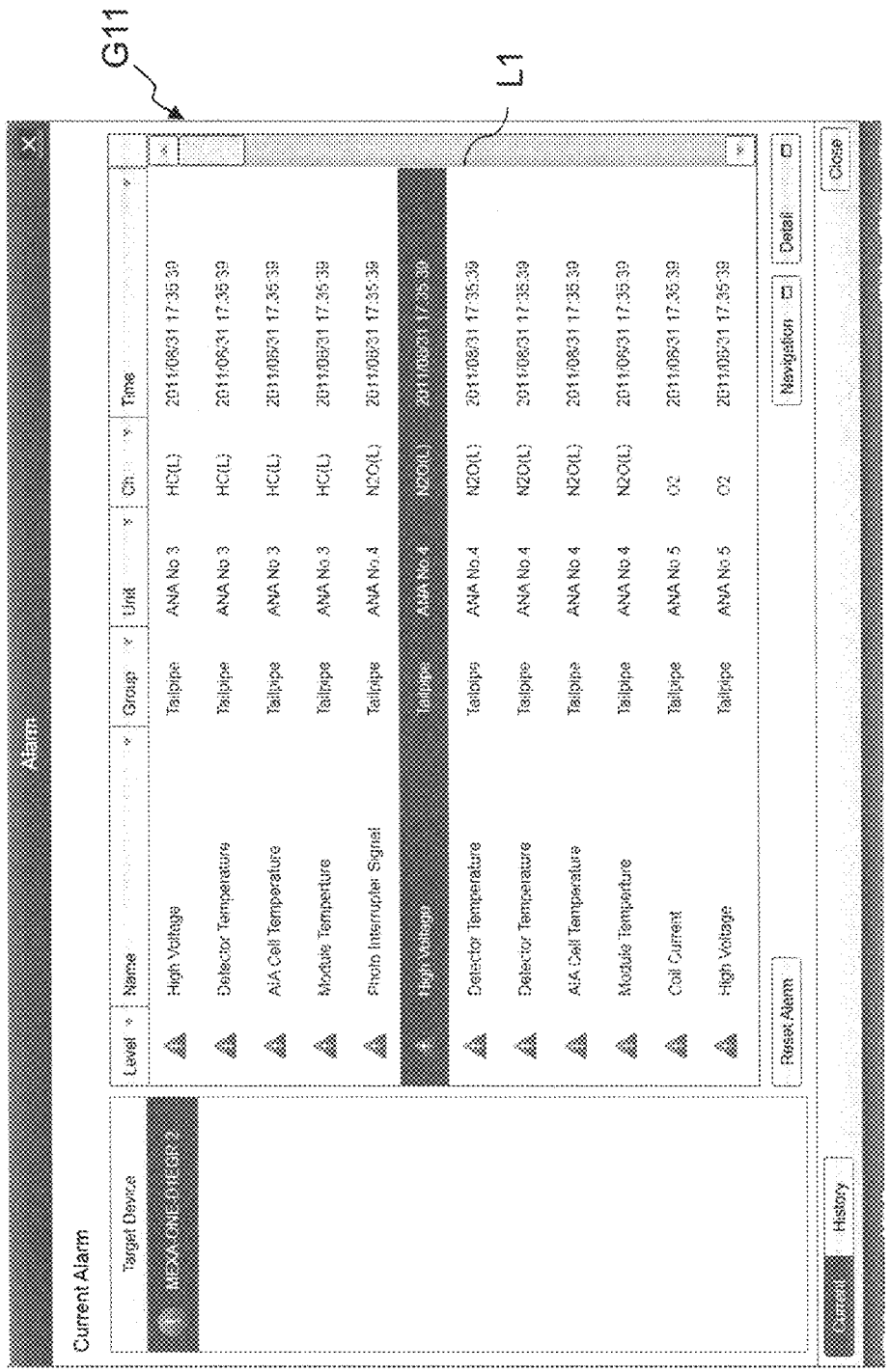
FIG. 11 is a screen explanatory diagram illustrating a trouble list display screen in the second embodiment.
Figure 12:
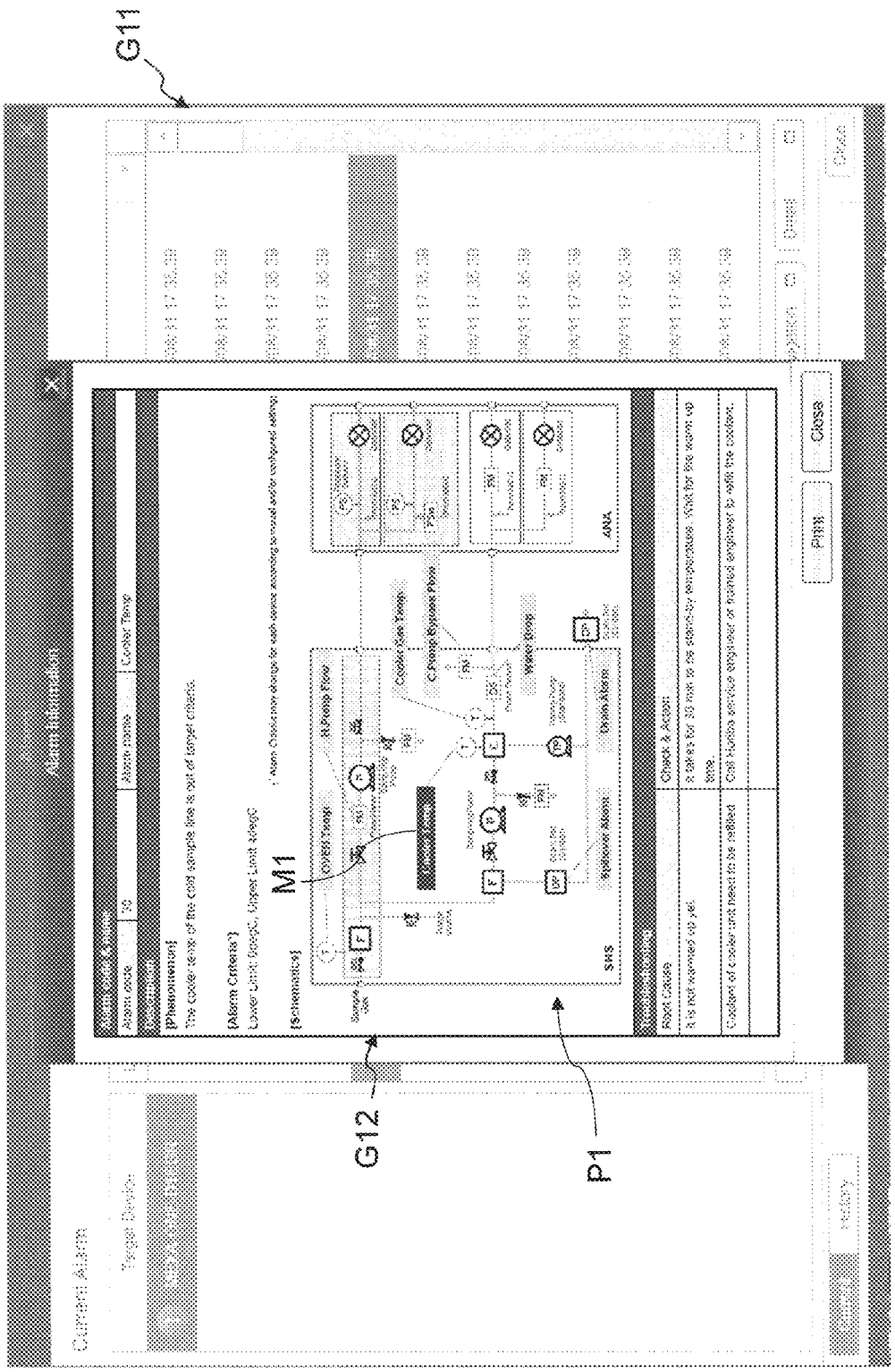
FIG. 12 is a screen explanatory diagram illustrating a locational information display screen in the second embodiment.

The display part 166 is one that controls the display 167, and as illustrated in FIGS. 10, 11, and 12, fulfills a monitoring screen display function (function as a monitoring screen display part), a trouble list display function (function as a trouble list display part), a locational information screen display function (function as a locational information screen display part, and other functions. The monitoring screen display function refers to a function of displaying a monitoring screen G10 provided with an alarm icon R1 that lights when the trouble data recording part 163 records trouble data. The trouble list display function is a function of displaying a trouble list display screen G11 that presents contents of pieces of trouble data, which have been transferred to the trouble data recording part 163, in the form of a table that is demarcated for each of the pieces of trouble data. The locational information screen display function refers to a function of displaying a locational information screen G12 that schematically illustrates a location where among the pieces of trouble data listed in the trouble list, trouble data selected by the operator is obtained.

The input receiving part 168 is one that, by clicking the alarm icon R1 displayed on the monitoring screen G10 illustrated in FIG. 10 with the mouse or the like, receives a switch to the trouble list display screen G11. Also, the input receiving part 168 is one that by clicking with the mouse or the like, receives designation of any one of the pieces of trouble data displayed in the trouble list L1, and the display part 166 is adapted to, according to the designation, display the locational information screen G12 that presents a flow path circuit diagram P1 indicating a location where the designated trouble data is obtained, and a way to handle trouble indicated by the trouble data.

Next, operation of the vehicle performance test system 100 having such a configuration is described.

First, when the situation data obtaining part 401 including the pressure sensor, temperature sensor, and the like outputs pieces of situation data such as pressure data and temperature data, the data receiving part 161 continuously receives the pieces of situation data, and continuously writes the pieces of received situation data in the temporary data storage part 162.

Subsequently, on the basis of the criterion parameters obtained from the criterion parameter storage part 165, the data management part 164 determines any of contents of the pieces of situation data stored in the temporary data storage part 162 meets a corresponding one of the predetermined conditions respectively corresponding to the occurrence of troubles.

If it is determined that any of the contents of the pieces of situation data stored in the temporary data storage part 162 meets a corresponding one of the predetermined conditions respectively corresponding to the occurrence of the troubles, a corresponding one of the pieces of situation data is transferred to the trouble data recording part 163 as trouble data.

When the trouble data is transferred to the trouble data recording part 163, as illustrated in FIG. 10, the alarm icon R1 provided in an upper part of the monitoring screen G10 lights.

Then, when the operator clicks the alarm icon R1 on the monitoring screen G10 with the mouse or the like, the display part 166 obtains pieces of trouble data from the trouble data recording part 163. The display part 166 having obtained the pieces of trouble data displays, as illustrated in FIG. 11, at least contents related to predetermined items from among contents of the pieces of trouble data on the trouble list display screen G11 as the trouble list L1 having the form of a table that is demarcated for each trouble data. The items displayed in the trouble list L1 can be appropriately selected, and include, for example, states of pressure, temperature, and the like, flow path systems where troubles occur, analyzers where troubles occur, occurrence dates of the troubles, and occurrence times of the troubles, and the like. In addition, in the trouble list L1, pieces of trouble data are displayed with being classified for each flow path system.

Figure 13:
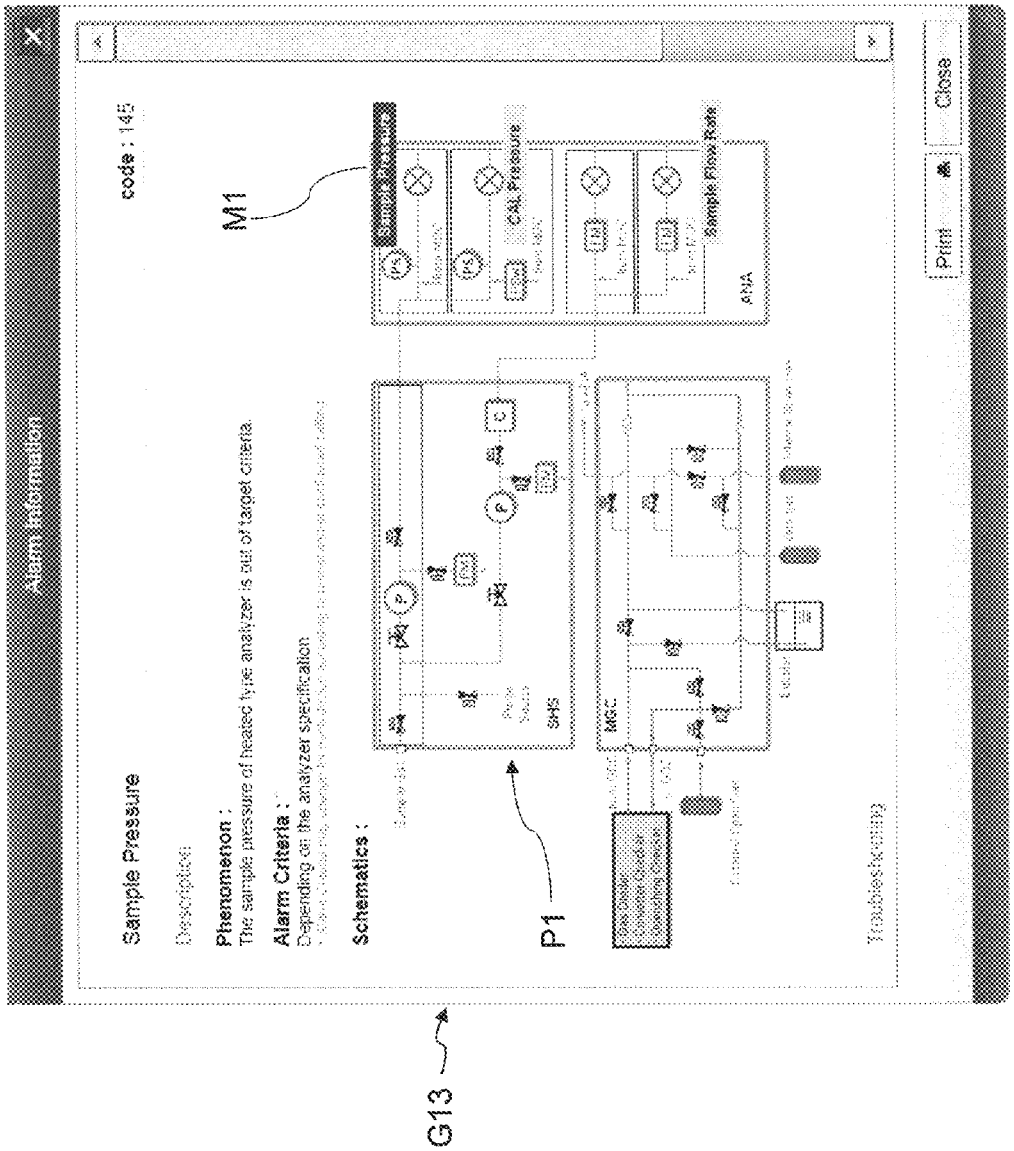
FIG. 13 is a screen explanatory diagram illustrating a locational information display screen in another embodiment.

When the operator clicks and selects intended trouble data with the mouse or the like from the trouble list L1 displayed on the trouble list display screen G11, the selected trouble data is highlighted, and also as illustrated in FIG. 12, the locational information screen G12 is displayed in another window, on which the flow path circuit diagram P1 provided with a mark M1 that indicates a location where the selected trouble data is obtained and an outline of corresponding trouble is displayed. On the locational information screen G12, a way to handle the trouble is displayed together. Then, when other trouble data is selected, as illustrated in FIG. 13, a new locational information screen G13 is displayed.

According to the vehicle performance test system 100 according to the second embodiment configured as described, because troubles having occurred are displayed on the trouble list display screen G11 as a list, the whole picture of a trouble occurrence situation can be overlooked, and also a location where selected trouble occurs is illustrated in the flow path circuit diagram P1 displayed on the locational information screen G12, so that the location where the trouble occurs can be easily visually recognized. For this reason, a location where trouble occurs can be quickly grasped to immediately resolve the trouble.

Also, only a selected trouble occurrence location is indicated by the mark M1 on the locational information screen G12, and therefore even in the case where another trouble occurrence location is present on the locational information screen G12, it is easy to specify the selected trouble occurrence location.

Note that the present invention is not limited to the above-described second embodiment.

Figure 14:
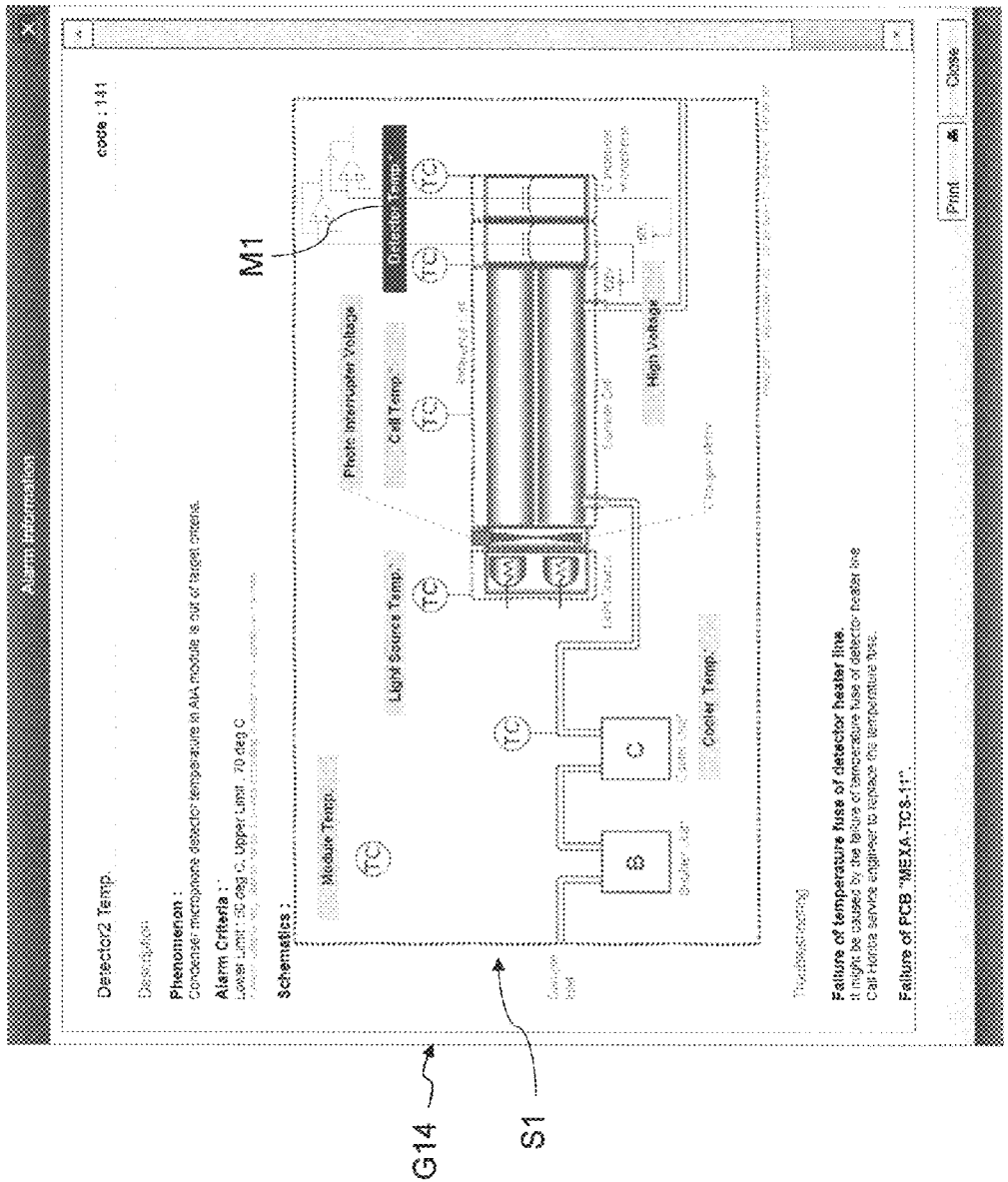
FIG. 14 is a screen explanatory diagram illustrating a locational information display screen in still another embodiment.

In the above-described second embodiment, in order to schematically illustrate, on the locational information screen, a location where trouble data is obtained, the flow path circuit diagram is used; however, as illustrated on a locational information screen G14 of FIG. 14, the present invention may use, in place of the flow path circuit diagram, a structure diagram Si schematically presenting a mechanical configuration of a unit including one or more analyzers.

Also, the above-described second embodiment is configured to, on the locational information screen, indicate only a selected trouble occurrence location with the mark; however, the present invention may be adapted to, in the case where a plurality of trouble occurrence locations is present on the same locational information screen, indicate all of the locations with marks.

Further, in the above-described second embodiment, the trouble list display screen and the locational information screen are respectively displayed in separately opened windows; however, the present invention may be adapted to divide one window into two screens to collectively display the trouble list display screen and the locational information screen in the one window.

In addition, the present invention can be variously modified without departing from the scope thereof.

REFERENCE SIGNS LIST

1: Vehicle performance test system
4: Exhaust gas measuring device
5: Device management apparatus
53: Management main body part
55: Display part
10: Alarm icon
10*a*: Sensitivity alarm icon
10*b*: Accumulated operating time alarm icon
10*c*: Inspection date/time alarm icon
VH1: Vehicle
100: Vehicle performance test system
104: Exhaust gas measuring device
401: Situation data obtaining part
106: Device management apparatus
163: Trouble data recording part
G11: Trouble list display screen
G12: Locational information screen While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A test system intended to perform a test of an object, the test system comprising:
one or more testing devices used for the test; and
a device management apparatus that is communicably connected to the testing devices to manage the testing devices, and that includes a display part configured to obtain various types of information outputted from the testing devices, to erasably, switchably, or movably display the pieces of information on a display, to preferentially display three alarm icons on the display regardless of the display of the pieces of information, and to alter a form of at least one of the three icons in response to contents indicated by respective pieces of alarm information, wherein the respective pieces of alarm information include sensitivity alarm information indicating a reduction in sensitivity of each of the testing devices, accumulated operating time alarm information that is alarm information on an accumulated operating time of at least one of the testing devices, and inspection date/time alarm information that is information indicating approaching or passing of an inspection date/time of at least one of the testing devices.

2. The test system according to claim 1, configured such that
a single alarm icon display area that displays the three alarm icons as a set is provided on the display.

3. The test system according to claim 1, configured such that
when any of the alarm icons is selected and operated, a switch to a list display screen that provides a list display of alarms as a list with demarcating the alarms for each occurrence location and for each content is made; and further, when one column on the list display screen is designated and operated, a predetermined unit schematic diagram including an generation location of an alarm is displayed, and in the schematic diagram, the alarm generation location is displayed with the location being specified.

4. The test system according to claim 1, wherein
the testing devices are measuring devices used to measure exhaust gas of an internal combustion engine.

5. A device management apparatus that is communicably connected to one or more testing devices for testing a moving body, the device management apparatus having
a display part that obtains various types of information outputted from the testing devices, and erasably, switchably, or movably displays the pieces of information on a display, wherein regardless of the display of the pieces of information, the display part preferentially displays three alarm icons that are respectively for three pieces of alarm information including sensitivity alarm information indicating a reduction in sensitivity of each of the testing devices, accumulated operating time alarm information that is alarm information on an accumulated operating time of the testing device, and inspection date/time alarm information that is information indicating approaching or passing of an inspection date/time of the testing device, and changes a form of at least one of the three icons depending on contents indicated by the respective pieces of alarm information.

6. A vehicle performance test system comprising:
a measuring device that analyzes exhaust gas to measure performance of a vehicle; and
a management apparatus that manages the measuring device, wherein the management apparatus includes
a situation data obtaining part that, as situation data, successively obtains information on an operating situation of the measuring device,
a trouble data recording part that in a case where content of the obtained situation data meets a predetermined condition, records the situation data in a memory as trouble data,
a trouble list display part that displays, among contents indicated by pieces of trouble data recorded in the trouble data recording part, at least contents related to a predetermined item on a screen in a form of a table that is demarcated so as to be able to select each of the pieces of trouble data, and
a locational information screen display part that, in response to a selection of one of the pieces of trouble data from the table, displays a locational information screen that illustrates a location associated with the measuring device where the selected one of the pieces of trouble data was obtained.

7. The vehicle performance test system according to claim 6, comprising
a monitoring screen display part that, on the screen, displays an alarm icon that lights when the trouble data recording part records trouble data.

* * * * *